United States Patent [19]
Russ et al.

[11] Patent Number: 5,623,481
[45] Date of Patent: Apr. 22, 1997

[54] AUTOMATED PATH VERIFICATION FOR SHN-BASED RESTORATION

[76] Inventors: Will Russ, 18081 Midway Rd., #1227, Dallas, Tex. 75287; Mark W. Sees, 1113 Green Park Dr., Plano, Tex. 75043

[21] Appl. No.: 483,525

[22] Filed: Jun. 7, 1995

[51] Int. Cl.⁶ .................................................. H04J 3/14
[52] U.S. Cl. ...................... 370/225; 370/248; 395/182.02
[58] Field of Search .................................. 370/13, 14, 16, 370/54; 395/200.11, 181, 182.01, 182.02; 379/221

[56] References Cited

U.S. PATENT DOCUMENTS

| | | | |
|---|---|---|---|
| 4,723,241 | 2/1988 | Grobel et al. | 395/182.02 |
| 4,745,593 | 5/1988 | Stewart | 370/15 |
| 4,956,835 | 9/1990 | Grover | 370/16 |
| 5,093,824 | 3/1992 | Coan et al. | 370/16 |
| 5,235,599 | 8/1993 | Nishimura et al. | 370/16 |
| 5,435,003 | 7/1995 | Chng et al. | 395/182.02 |
| 5,495,471 | 2/1996 | Chow et al. | 370/16 |
| 5,537,532 | 7/1996 | Chng et al. | 395/182.02 |

*Primary Examiner*—Douglas W. Olms
*Assistant Examiner*—Min Jung

[57] ABSTRACT

To verify that a communications path restored in response to a failure to a telecommunications network is a validly restored path, each of the end nodes terminating the restored communications path sends out a message containing data that identifies that node and the ID of the access/egress port to which the STS-1 circuit forming the communications path is connected. Once the respective path verification messages are exchanged between the two end nodes of the communications path, the Operations Support System (OSS) that oversees the topology of the network retrieves those messages and compares the data contained therein with the data of the same type of messages from the same ends nodes that were stored just prior to the occurrence of the disruption to the communications path. The restored communications path is deemed to be verified if there are no differences between the path verification messages retrieved after the failure event and the path verification messages stored just prior to the failure event.

19 Claims, 2 Drawing Sheets

AUTOMATED PATH VERIFICATION FOR SHN-BASED RESTORATION

RELATED APPLICATIONS

This invention relates to an application by W. Russ entitled "System and Method for Resolving Substantially Simultaneous Bi-directional Requests of Spare Capacity" (Docket No. RIC-95-009), to be assigned to the same assignee as the instant invention and filed concurrently herewith having Ser. No. 08/483,578. This invention is further related to an application by Russ et al. entitled "Method and System for Resolving Contention of Spare Capacity Circuits of a Telecommunications Network" (Docket No. RIC-95-005), to be assigned to the same assignee as the instant invention and filed on Jun. 6, 1995 having Ser. No. 08/468,302. The disclosure of the application having the '005 docket number is incorporated by reference to this application. This invention is furthermore related to an application by W. Russ entitled "Automated Restoration of Unrestored Link and Nodal Failures" (Docket No. RIC-95-059), to be assigned to the same assignee as the instant invention and filed concurrently herewith having Ser. No. 08/483,579. The disclosure of the related '005 docket number application may be reviewed for an understanding of the concepts of distributed restoration algorithms. This invention is yet further related to an application by J. Shah entitled "Method and System for Identifying Fault Locations In a Communications Network" (Docket No. RIC-95-022), to be assigned to the same assignee as the instant invention and filed concurrently herewith having Ser. No. 08/481,984. This invention is yet furthermore related to an application by Chow et al. entitled "System and Method for Restoring a Telecommunications Network Based on a Two Prong Approach" filed on Mar. 9, 1994 having Ser. No. 08/207,638 and assigned to the same assignee as the instant invention. The disclosure of the '638 application is incorporated by reference herein.

FIELD OF THE INVENTION

This invention is related to distributed restoration algorithms (DRA) and more particularly to the verification of an alternate route found subsequent to a restorative process based on the self healing network (SHN) restoration of a telecommunications network due to a failure or disruption in the network.

BACKGROUND OF THE INVENTION

A self healing network (SHN) distributed restoration algorithm (DRA), is described by W. D. Grover in U.S. Pat. No. 4,956,835, which teaches the restoration of a disrupted traffic due to a failed link. There are, however, no teachings or suggestions on checking the validity of the alternate route after the restoration. In other words, the '835 invention assumes that once an alternate route is found to replace the failed link separating the sender and chooser nodes in the telecommunications network, the communications path of which the failed link is a portion is as good as new. That oftentimes may not be case, as an alternate route may end up utilizing a great number of spare circuits that were not used in the earlier communications path to carry the same traffic which was disrupted due to the failed link.

A need therefore exists for verifying the integrity of a restored communications path which had been disrupted due to the failure of a portion thereof.

BRIEF DESCRIPTION OF THE PRESENT INVENTION

To determine whether or not a link has been restored by means of an alternate route (alt route), the instant invention utilizes a path verification method and system to provide a true continuity check. In particular, an operations support system (OSS) of the telecommunications network retrieves from each of the end nodes that it monitors a special message that contains an identification of the end nodes and the access/egress port associated therewith to which the communications path is connected and through which traffic may be passed to another node or a different environment. The OSS monitors the nodes of the telecommunications network and particularly the end nodes of the various communications paths continuously and retrieves from each of the end nodes its special message on a periodic basis.

When a fault occurs at one of the links connecting adjacent nodes, such disruption is reported to the OSS. Thereafter, the adjacent nodes that bracket the failed link performs a SHN restoration to find an alt route to restore the disrupted traffic. Once an alt route is found, the communications path that was disrupted because of the failed link is reestablished across the various intermediate nodes. The two ends nodes to which the restored communications path is anchored exchange the special message bearing its node ID and the access/egress port to which the communications path is connected. Once the special messages are exchanged between the two end nodes, the OSS retrieves these special messages and compares each with the previously stored path verification message for each of the end nodes. If there are no changes between the earlier path verification message that was stored prior to the fault and the path verification message sent right after traffic has been restored for both end nodes, then it is clear that the communications path is continuous and valid. On the other hand, if there is a difference between the earlier stored path verification message and the latest path verification message for either one of the end nodes, then the OSS will send out an alarm indicating that the continuity check indicates that there may be a problem with the restored communications path.

An objective of the present invention is therefore to provide a method and system for determining whether a restored communications path is a valid path.

It is another objective of the instant invention to provide an automated scheme for determining the continuity of a restored communications path.

BRIEF DESCRIPTION OF THE DRAWINGS

The above mentioned objectives and advantages of the present invention will become apparent and the invention itself will be best understood by reference to the following description of an embodiment of the invention taken in conjunction with the accompanying drawings, wherein.

DETAILED DESCRIPTION OF THE PRESENT INVENTION

Figure 1:
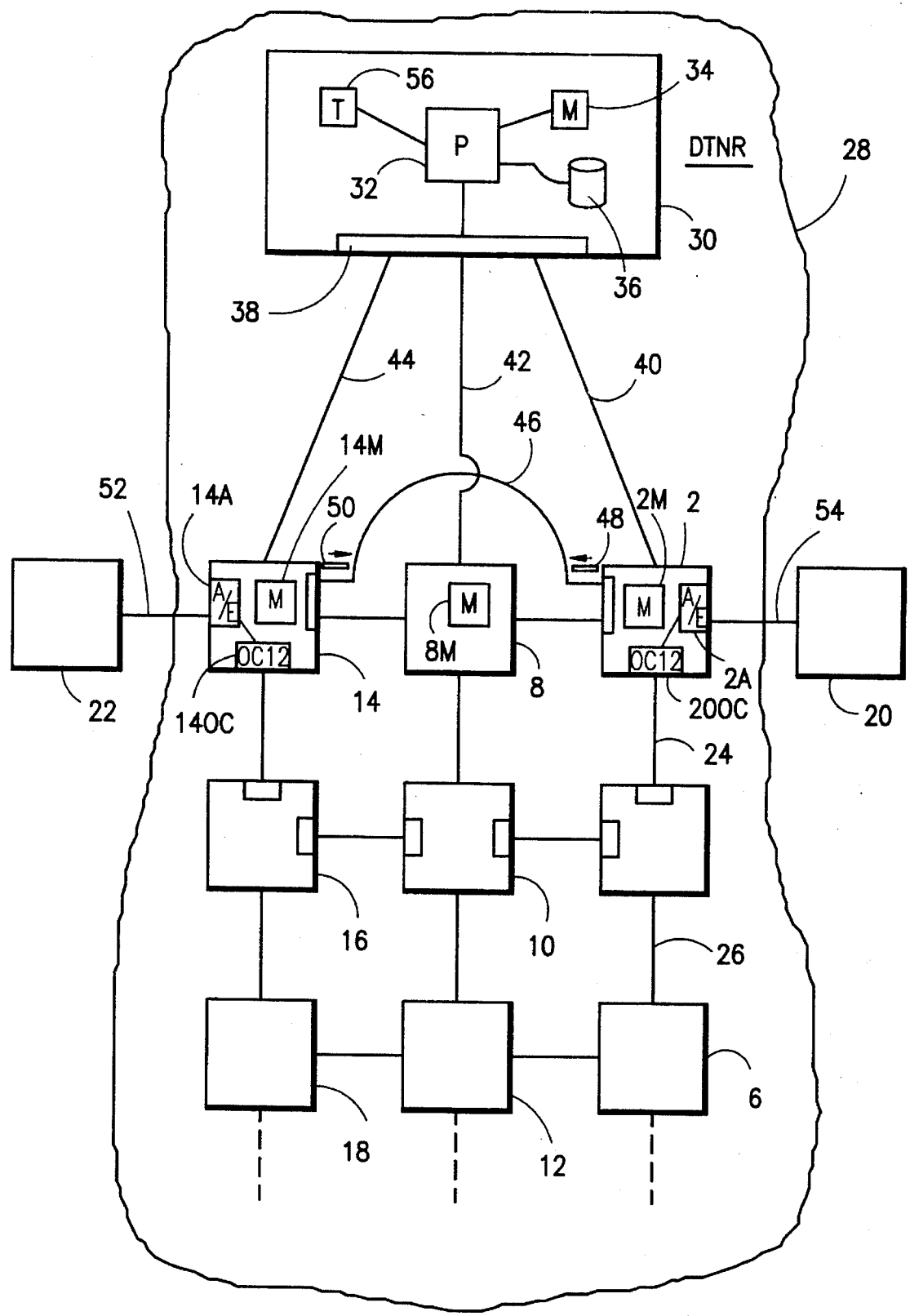
FIG. 1. is an illustration of a telecommunications network of the present invention in which a plurality of nodes are shown to be cross-connected to each other and to an operational support system.

A telecommunications network of the present invention, as shown in FIG. 1, comprises a number of nodes 2–22 each connected to adjacent nodes by respective spans such as for example spans 24 between nodes 2 and 4, and 26 between nodes 4 and 6. For the instant invention, the telecommunications network may be considered to be divided into an environment that is capable of distributed restoration which, for this invention, may be referred to as a dynamic transmission network restoration (DTNR) domain, designated as 28. Nodes such as 20 and 22 shown to be outside of the DTNR domain 28 may be considered to be in an environment that may not be subject to automated distributed restoration. For example, nodes 20 and 22 may be switches that are connected to multi-plexers or local telephone switches. For the sake of simplicity, such multi-plexers and local switches are not shown.

Within the DTNR domain there is also an operational support system (OSS) 30. OSS 30 is where the network management monitors the overall operation of the network. In other words, it has an overall view, or map, of the layout of each node within the network. For the understanding of this invention, it suffices to say that OSS 30 has a central processor 32 that has connected thereto a working memory 34 and a database storage 36. Also connected to processor 32 is an interface unit 38 which has a number of ports for effecting connections to each of the nodes within the network. Again, for the sake of simplicity, only nodes 2, 8 and 14 are shown to be connected to the ports of interface unit 38 via lines 40, 42 and 44, respectively. Thus, the goings on within each of the nodes of the network is monitored by OSS 30.

Each of the nodes in the network comprises a cross-connect switch such as the 1633-SX broadband cross-connect switch made by the Alcatel Network Systems Company. A more detailed illustration of the digital cross-connect switch (DCS) may be gleaned from either of the above mentioned applications having the '005 and '059 docket numbers. In essence, each DCS has a number of access/egress ports with their own IDs. In addition, each DCS has a number of working links and spare and open links. These links may be in the form of fiber optic cables such as the optical cable OC-12 link. There are 12 SONET synchronous transport signal level-1 (STS-1) circuits in each of the OC-12 link. Thus, even though the circuits connecting the adjacent nodes in FIG. 1 are shown to have only 1 line, in actuality, there are a number of OC-12 links within each span for connecting the adjacent nodes. For the instant invention, an access/egress port may be defined as a STS-1/DS-3 (Synchronous Transport Signal Level 1/Digital Service Level 3) port where a circuit enters and exits DTNR domain and is cross-connected to a working link in the DTNR domain.

Although not shown, there are also lightwave transmitting equipment connected to each of the nodes for transmitting the light signals to the adjacent nodes. The interface connection for the OC-12 links are illustrated, for example, at nodes 2 and 14 as 2OC and 14OC, respectively. Also in each of the nodes, as illustrated in nodes 2, 8 and 14 for example, is a memory store, respectively designated as 2M, 8M and 14M. For nodes 2 and 14, the access/egress ports are shown as 2A and 14A, respectively.

For the instant invention, the access/egress ports such as 2A and 14A will send their port numbers through the matrix in each of the DCSs to the working ports such as 2OC and 14OC shown in nodes 2 and 14, respectively. There, the OC12 ports will insert the port number (which ever port of the plurality of the available ports) and the node ID (node 2 or node 14 for example) into a unique path verification circuit ID (PVCID) message. For each of the 12 STS-1 circuits within the OC-12 link, the PVCID message is encapsulated within a conventional link access procedure-D (LAP-D) protocol frame for transmission in the SONET overhead.

For the instant invention, this PVCID message is only generated by the end nodes of a communications path, for example a communications path such as that created by the glass through or express pipe 46 which connects node 2 to node 14. Thus, for the embodiment network shown in FIG. 1, a PVCID message, such as 48, is generated by node 2 and travels across the communication path comprising link 46 to the far end node of the communication path, in this instance, node 14. This PVCID message 48 is then be read by end node 14 and stored in its memory 14M.

In the meantime, node 2, the other far end node which together with node 14 sandwich or bracket the communication path formed by link 46, generates new PVCID messages once every given time interval. These messages are sent from node 2 across the communications path that connects it to node 14 to update the status of the access/egress port and node 2 with node 14. Thus, if a PVCID message is not received from node 2 by node 14 within a given time period, there will be an alarm sent out from node 14 to OSS 30 to inform it that there is a loss of continuity for that particular STS-1 circuit. It is assumed here that each STS-1 circuit forms one communications path between two end nodes and each STS-1 carries its own PVCID message and resulting continuity check.

At the same time, node 14 is generating its own PVCID messages, designated as 50, and forwards those messages across the same STS-1 path, as for example within link 46, across to the other far end node, node 2 for the instant exemplar embodiment. The PVCID message from node 14 likewise is sent periodically to node 2 for updating the status of node 14, both in terms of its access/egress port ID and its node ID. Similarly, node 2, upon receipt of the PVCID message from node 14, stores the data in the message in its memory 2M and updates this data every time it receives a PVCID message from its far end node, for example node 14 for the FIG. 1 embodiment. The forwarding of the PVCID messages may be done by the interface units 2I and 14I in nodes 2 and 14, respectively.

OSS 30 polls each of the nodes of the network cross-connected thereto periodically. In the case of end nodes such as 2 and 14, OSS 30 retrieves from their respective memories 2M and 14M the stored PVCID data. This data may be stored in database store 36 or in its working memory 34. Thus, there is always an updated record of the end nodes and their respective access/egress port IDs for each communications path in the network. Note that this is necessary insofar as each of the end nodes of a communications path would not know what its far end counterpart is doing without its far end counterpart PVCID message being sent thereto. The OSS will also know of the termination of a failure event, which otherwise may not be known by the end nodes. Thus, OSS 30 provides an overall view of all of nodes of the network and particularly, for this invention, oversees the end nodes to which a communications path is connected.

As shown in FIG. 1, the end nodes, and particularly its access/egress ports, provide the medium for exchanging data and/or traffic between the DTNR domain 28 and its environment. Thus, as shown in FIG. 1, this exchange of traffic may occur between end node 14 and outside node 22 via circuit 52. Alternatively, the exchange of traffic between DTNR domain 28 and its environment may be effected between node 2 and node 20 via circuit 54.

Thus, prior to a failure in the network, OSS 30 has in storage a record of the status of any two end nodes to which a communications path is connected. This record is updated periodically so that if there are changes, the management of the network would be informed, as for example, via terminal 56.

Figure 2:
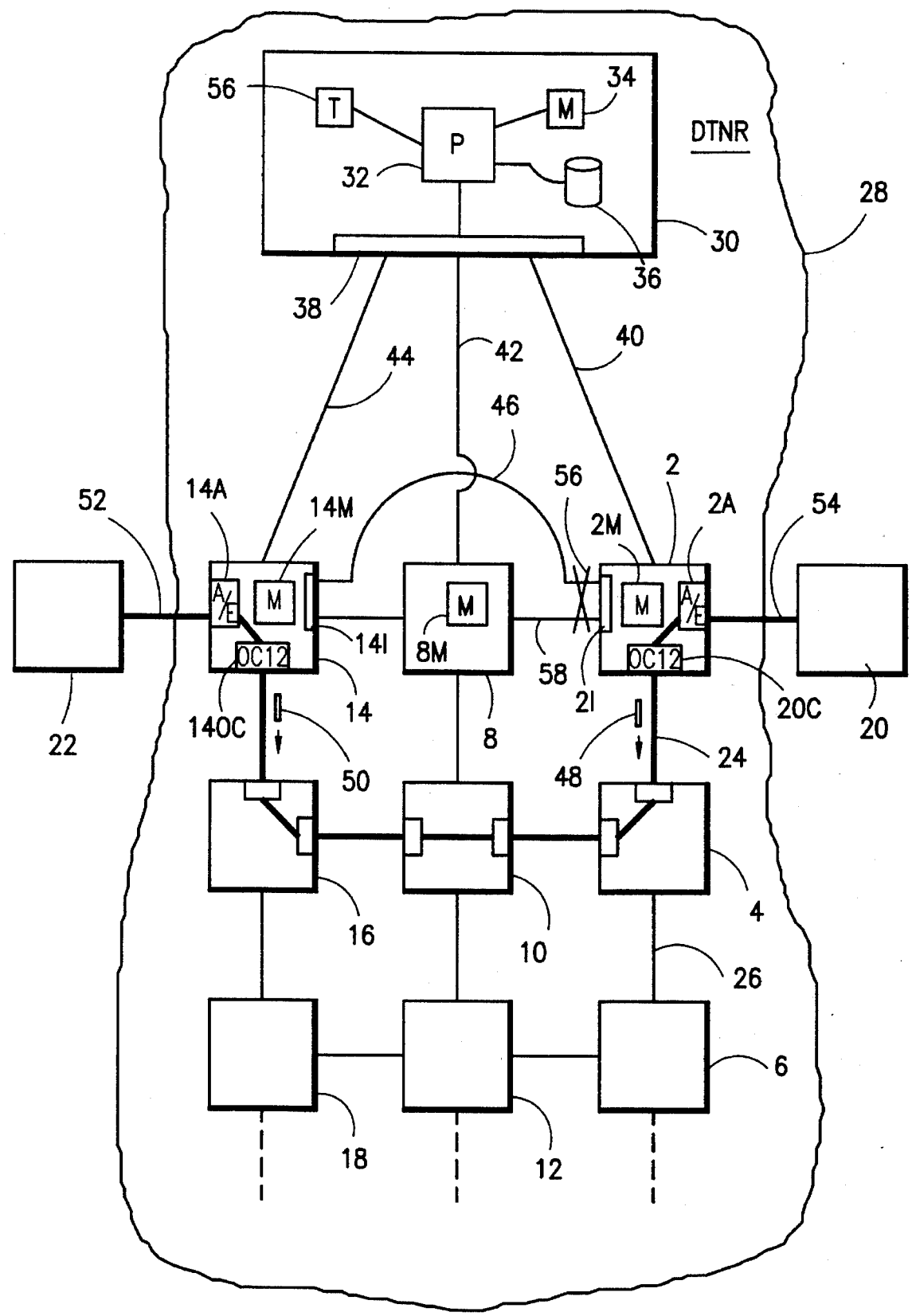
FIG. 2 is an illustration that is the same as the FIG. 1 illustration but after a failure has occurred in the network.

With reference to FIG. 2, a fault 56, for example a fiber cut, is shown to have occurred between node 2 and node 8. This exemplar failure involves 2 links, namely express pipe link 46 that cross-connects node 2 to node 14 and link 58 which cross-connects node 2 to node 8. For the discussion of this embodiment, however, given the fact that only one communications path was discussed above, for the sake of simplicity, we assume that only link 46 that cross-connects node 2 to node 14 is of import. In other words, we are assuming for this discussion that link 58 which cross-connects node 2 to node 8 may very well be a non-working link, for example a spare or an open link, or another type of back-up link that does not carry traffic. Thus, for the DTNR domain 28 shown in FIG. 2, there is a disruption to the traffic which traverses across the communications path, otherwise designated as link 46, between node 2 and node 14.

Given the distributed nature of DTNR domain 28, node 2 and node 14 each will detect a loss of signal from its far end, in this instance its opposite end node. Upon such detection of loss signal, a distributed restoration, in the form of a SHN scheme, is begun by both nodes 2 and 14. The operation of such SHN scheme can be gleaned from any of the above mentioned related applications, and/or from the incorporated '835 patent. In essence, restoration signatures or messages are sent, or flooded, by the respective adjacent nodes, namely nodes 2 and 14, to their respective adjacent links for finding an alt route to bypass the failed link by the sender node of the node/chooser pair.

In the example embodiment, using the conventional higher/lower number node arbitration method, node 2 is assumed to be the sender and node 14 the chooser. Thus, node 2 will send out flooding signatures to its adjacent links until node 14 has received the first of such flooding signatures. In response, node 14 will send complement signatures or messages to reverse link, and reserve, the links that have been flooded by the restoration signatures until the complement signatures reach sender node 2. Thereafter, an alt route, darkened in FIG. 2 for illustration purpose, is formed between node 2 and node 14. This alt route goes from node 2 to node 4 to node 10 to node 16 and then to node 14, and utilizes the spare links interconnecting sender node 2 and chooser node 14 to the intermediate nodes 4, 10 and 16.

Given the fact that nodes 2 and 14 were deemed to be the end nodes of the communications path formed by now failed link 46, it should be appreciated that the new communications path is formed with the two end nodes 2 and 14 cross-connected to intermediate nodes 4, 10 and 16. The traffic that was interrupted when link 46 was cut can now be routed to the new communications path. Note, however, that even though there is a new communications path, in actuality, the new communications path is physically different from the old communications path represented by link 46. Thus, a determination needs to be made on the continuity or integrity of the new communications path between end nodes 2 and 14.

As shown in FIG. 2, as before, a PVCID message 48 is sent, right after the restoration of the communications path, by end node 2 to end node 14. Similarly, a PVCID message 50 is sent by end node 14 to end node 2. As mentioned before, each of the end nodes carries a unique identifier containing information relating to its originating node, as for example the ID of the originating node, and the ID of the access/egress port to which the STS-1 circuit that forms the communications path is connected. Thus, PVCID message 48 will contain information relating to node 2 while PVCID message 50 will contain information relating to node 14. The respective data contained in the PVCID messages 48 and 50 are stored in memory 14M and memory 2M, respectively, of end nodes 14 and 2.

Given the fact that OSS 30 will poll the nodes of the network right after a disruption to the network, the data relating to the ports and the nodes that the ports reside in which form the ends of the communications path within the DTNR domain 28 is retrieved by OSS 30 and put in its memory 34. Thereafter, processor 32 will retrieve the same information relating to the same communications path stored right before the communications path was disrupted, and compares the two sets of access/egress port IDs, as well as the node IDs, to determine if there have been any changes.

In other words, the unique identifiers of the end nodes of the communications path that were stored prior to the disruption are compared with the unique identifiers of the reestablished communications path. If there is no difference between those unique identifiers, then OSS 30 informs the network management that the newly restored communications path is a valid path. However, if any of the data retrieved from the new PVCID messages is different from the data of those PVCID messages stored just prior to the failure, then OSS30 will report an error to the network management via terminal 56 so that further action may be taken for restoring the traffic disrupted by the cut link. Putting it differently, OSS 30 will compare the PVCID messages received right after the failure event and compare them to the pre-event topology that was stored in its database 36 to confirm that the new alt route STS-1 is connected to the same access/egress ports as before the failure event.

Note that changes to the PVCID messages received at an access/egress port by an end node are considered normal because of the normal provisioning of the network; hence the periodic updating of the PVCID messages in the respective memories of the end nodes. However, after a failure, it is necessary that the correct access/egress port in both of the end nodes be reconnected so that the appropriate communications path be restored. Putting it simply, the present invention does not function to police the misprovisioning of STS-1 circuits between different nodes. Rather, it is used to verify the continuity of a communications path before and after an event, as for example a failure that occurred at the network between two adjacent nodes.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the present invention be limited only by the spirit and scope of the hereto appended claims.

We claim:

1. In a telecommunications network, a system for verifying an alternate route found in a restorative process initiated in response to a failure of a communications path, comprising:

one and an other end nodes communicatively connected by said alternate route;

transmitting means in said one end node for forwarding one path verifying message from said one end node to said other end node;

transmitting means in said other end node for forwarding other path verifying message from said other end node to said one end node;

central processing means connected to each of said one and other end nodes, said central processing means comparing said one path verifying message with a previously stored one path verifying message;

comparing said other path verifying message with a previously stored other path verifying message; and confirming said communications path to be valid if said one and said stored one path verifying messages are the same and said other and said stored other messages are the same.

2. System of claim 1, further comprising:

a sender node positioned to one side of said failure along said communications path;

a chooser node positioned to other side of said failure along said communications path;

said sender and chooser nodes cooperatively effecting said restorative process to find said alternate route to reroute traffic disrupted by said failure after said failure.

3. System of claim 1, wherein each of said one and other path verifying messages includes a unique identifier representative of the end node that sent said each message.

4. System of claim 3, further comprising:

a plurality of interconnected nodes including said one and other end nodes, each of said nodes having multiple ports for cross connecting with adjacent nodes;

wherein each of said end nodes has a port with an ID for providing connection to said communications path; and wherein said each identifier includes the ID of the port of the node and the ID of the node that sent the path verifying message to which said each identifier resides.

5. System of claim 1, further comprising at least one Distributed Transmission Network Restoration (DTNR) domain encompassing said communications path and said end nodes; and wherein each of said end nodes comprises at least one access/egress port through which traffic routed along said communications path may be exchanged between said DTNR domain and its environment.

6. System of claim 1, wherein said one and other end nodes are respective far end nodes of each other;

wherein each of said respective transmitting means in said one and other end nodes forwards its path verifying message to its far end node at predetermined periodic time intervals before said failure and after said alternate route has been found;

said system further comprising:

means in each of said one and other end nodes for storing each new path verifying message forwarded thereto by its far end node.

7. System for checking validity of an alternate route found in a restorative process initiated in response to a disruption of traffic in a Distributed Transmission Network Restoration (DTNR) domain having a plurality of elements, comprising:

central processor means communicatively connected to each of said elements, said elements including at least two end nodes each providing at least one access/egress port to which said alternate route is connected and through which traffic may be exchanged between said DTNR domain and its environment, each of said two end nodes being a far end node of the other;

each of said end nodes having transmitting means for forwarding a path verifying message to its far end node after said disruption;

each of said end nodes further having store means for storing the path verifying message sent thereto after said alternate route has been found;

said central processing means retrieving the respective path verifying messages stored in each of said end nodes after said alternate route has been found and comparing said respective messages with respective path verifying messages stored in said end nodes just prior to said disruption to check the validity of said alternate route.

8. System of claim 7, wherein said DTNR domain further comprises:

a sender node and a chooser node each positioned along a communications path to which said disruption occurred, said sender node and said chooser node sandwiching said interruption along said communications path;

said sender and chooser nodes cooperatively effecting said restorative process to find said alternate route to reroute traffic affected by said disruption.

9. System of claim 7, wherein each of said path verifying messages includes a unique identifier representative of said end node that sent said each message.

10. System of claim 9, wherein said each identifier includes the ID of the one access/egress port and the ID of whichever one of said end nodes that sent the path verifying message to which said each identifier resides.

11. In a telecommunications network, a method of verifying an alternate route found in a restorative process initiated in response to a failure of a communications path between two end nodes to restore traffic disrupted by said failure, comprising the steps of:

(a) forwarding one path verifying message from one of said end nodes to other of said end nodes;

(b) forwarding other path verifying message from said other end nodes to said one end node;

(c) comparing said one path verifying message with a previously stored one path verifying message;

(d) comparing said other path verifying message with a previously stored other path verifying message; and (e) confirming said communications path to be valid if no difference exists between said respective compared messages.

12. Method of claim 11, further comprising the steps of:

(f) selecting a sender node positioned to one side of said failure along said communications path;

(f) selecting a chooser node positioned to other side of said failure along said communications path;

said sender and chooser nodes cooperatively effecting said restorative process to find said alternate route to reroute traffic disrupted by said failure after said failure.

13. Method of claim 11, further comprising the step of:

providing a unique identifier to each of said one and other path verifying messages for identifying the end node that sent said respective verifying messages.

14. Method of claim 11, further comprising the steps of:

encompassing said communications path and said end nodes within at least one Distributed Transmission Network Restoration (DTNR) domain; and provisioning each of said end nodes to include at least one access/egress port through which traffic routed along said communications path may be exchanged between said DTNR domain and its environment.

15. Method of claim 11, further comprising the step of:

designating said one and other end nodes as respective far end nodes of each other;

wherein each of said steps (a) and (b) further comprises the step of forwarding the path verifying message of said respective end node to its far end node at predetermined periodic time intervals before said failure and after said alternate route has been found;

for each of said one and other nodes, said method further comprising the step of storing each new path verifying message forwarded thereto by its far end node.

16. Method for checking validity of an alternate route found in a restorative process initiated in response to a disruption of traffic in a Distributed Transmission Network Restoration (DTNR) domain having a plurality of elements, comprising the steps of:

communicatively connecting central processor means to each of said elements, said elements including at least two end nodes each providing at least one access/egress port to which said alternate route is connected and through which traffic may be exchanged between said DTNR domain and its environment, each of said two end nodes being a far end node of the other, each of said end nodes having transmitting means and store means; and forwarding a path verifying message from each of said end nodes to its far end node after said disruption; and storing the path verifying message sent to each of said end nodes after said alternate route has been found;

said central processing means retrieving the respective path verifying messages stored in each of said end nodes after said alternate route has been found; and comparing said respective path verifying messages with respective path verifying messages stored in said end nodes just prior to said disruption to check the validity of said alternate route.

17. Method of claim 16, wherein said DTNR domain further comprises a sender node and a chooser node, said method further comprising the steps of:

designating said sender and chooser nodes being located along a communications path in which said disruption occurred at positions sandwiching said interruption; and effecting said restorative process between said sender and chooser nodes to find said alternate route to reroute the traffic affected by said disruption.

18. Method of claim 16, further comprising the step of:

providing a unique identifier to each of said path verifying messages for identifying the end node sent said each path verifying messages.

19. Method of claim 18, further comprising the step of:

provisioning each said unique identifier with the ID of the access/egress port and the ID of whichever one of said end nodes sent the path verifying message to which said identifier resides.

* * * * *